(12) United States Patent
Kiyosawa

(10) Patent No.: US 7,882,766 B2
(45) Date of Patent: Feb. 8, 2011

(54) AUTOMATIC TORQUE-SWITCHING APPARATUS

(75) Inventor: Yoshihide Kiyosawa, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 840 days.

(21) Appl. No.: 11/806,418

(22) Filed: May 31, 2007

(65) Prior Publication Data

US 2008/0026901 A1 Jan. 31, 2008

(30) Foreign Application Priority Data

Jul. 27, 2006 (JP) .............................. 2006-204515

(51) Int. Cl.
*F16H 33/00* (2006.01)
(52) U.S. Cl. ........................................................ 74/640
(58) Field of Classification Search .................... 74/640
See application file for complete search history.

(56) References Cited

U.S. PATENT DOCUMENTS 5,399,129 A * 3/1995 Ciolli ........................ 475/301
5,573,472 A * 11/1996 Ciolli ........................ 475/301

\* cited by examiner

*Primary Examiner*—David D Le
*Assistant Examiner*—Erin D Bishop
(74) *Attorney, Agent, or Firm*—Buchanan Ingersoll & Rooney PC

(57) ABSTRACT

In an automatic torque-switching apparatus (1), a fixed member (12) of a reduction device (8) is attached to an apparatus housing (2) via a one-way clutch (9) so as to not rotate in the direction of torque acting on the fixed member from the load side. A rotational input member (13) of the reduction device (8) and the fixed member (12) of the reduction device are linked via a torque limiter (10) so as to rotate integrally only when the torque acting on the fixed member (12) is less than or equal to a prescribed value. The speed reducing operation is not performed while the torque is less than or equal to the prescribed value, and the rotation of a motor (3) is output directly. When the torque exceeds the prescribed value, the reducing operation is performed, and a switch is automatically made to a rotational output having reduced speed and a large torque. An automatic torque-switching apparatus can be realized that has a small-sized, compact structure capable of reversibly switching from a state in which high-speed rotation is output directly to a state in which high-torque, low-speed rotation is output via a reduction device in accordance with the required torque.

5 Claims, 2 Drawing Sheets

A≦B

A>B

AUTOMATIC TORQUE-SWITCHING APPARATUS

TECHNICAL FIELD

The present invention relates to a driving apparatus for outputting the output rotation of a motor via a reduction device and particularly relates to an automatic torque-switching apparatus that rotates at high speed when the required torque is small and automatically switches to a low-speed rotation having a large output torque when the required torque is large.

BACKGROUND ART

In driving apparatuses provided with a motor and a reduction device, the high-speed output rotation of the motor is output as high-torque, low-speed rotation via the reduction device. The speed of the output rotation decreases in proportion to the reduction ratio. Directly outputting the high-speed rotation of the motor when the required torque is small and outputting high-torque rotation via the reduction device when the required torque is large may also be preferable depending on the intended usage.

An electromagnetic or other clutch mechanism is conventionally attached when using a driving apparatus for such applications, and the output rotation of the motor is switched between being directly output to the load side and being output to the reduction device.

DISCLOSURE OF THE INVENTION

It is an object of the present invention to provide an automatic torque-switching apparatus having a small-sized, compact structure capable of reversibly switching from a state in which high-speed rotation is output directly to a state in which high-torque, low-speed rotation is output via a reduction device in accordance with the required torque.

In order to achieve the above and other objects, an automatic torque-switching apparatus of the present invention is characterized in comprising a reduction device; a one-way clutch; a torque limiter; and an apparatus housing, wherein the reduction device has a fixed member, a rotational input member and a rotational output member, and wherein the fixed member is attached to the apparatus housing via the one-way clutch; and the rotational input member and the fixed member are connected via the torque limiter so as to rotate integrally only when a torque acting on the fixed member is less than or equal to a prescribed value.

The rotational input member of the automatic torque-switching apparatus of the present invention is made to rotate in the direction permitted by the one-way clutch. The rotational input member and fixed member of the reduction device are connected via the torque limiter. The rotational input member and the fixed member rotate integrally and the reducing operation of the reduction device is not performed until a torque greater than or equal to a prescribed value acts from the side of the rotational output member of the reduction device to the side of the fixed member. In other words, the rotational input member, fixed member, and rotational output member of the reduction device rotate as an integrated unit, and the high-speed rotation of the rotational input member is directly output to the load side.

When a load-side torque exceeding the prescribed value acts from the side of the rotational output member to the side of the fixed member, the torque limiter comes into operation, and the fixed member and the rotational input member are separated. The fixed member is connected to the apparatus housing via the one-way clutch, and rotation in the direction in which the torque acts is prevented. The fixed member is fixed to the apparatus housing, and therefore only the rotational input member rotates when a torque exceeding the prescribed value is applied. As a result, the reduction device comes into operation, the rotational speed of the rotational input member is decreased, and high-torque, low-speed rotation is output from the rotational output member to the load side. When the torque acting on the fixed member from the load side becomes less than or equal to the prescribed value, the speed reducing operation of the reduction device is stopped, and high-speed rotation is once again output from the rotational output member to the load side.

An adjusting mechanism for adjusting a friction engagement force between the rotational input member and the fixed member via the torque limiter is preferably used so that the torque value at which a switch is made can be adjusted.

The automatic torque-switching apparatus of the present invention is generally configured to comprise a motor for transmitting a rotational force to the rotational input member.

A variety of reduction devices may be used. When using, e.g., a planetary gear mechanism, the rotational input member is a sun gear; the fixed member is an internal gear or a planetary carrier for supporting planetary gears; and a rotational output member of the reduction device is the planetary carrier or the internal gear.

When using a wave gear mechanism as the reduction device, the rotational input member is a wave generator; the fixed member is a flexible external gear or a rigid internal gear; and a rotational output member of the reduction device is the rigid internal gear or the flexible external gear.

An automatic torque-switching apparatus of the present invention in which a wave gear mechanism is used as the reduction device is characterized in that the rigid internal gear is the rotational output member; the flexible external gear is the fixed member; a rotational input shaft extends from the wave generator in a coaxial state; a tubular member having one end securely connected in a coaxial state to the flexible external gear is disposed coaxially in a state in which the rotational input shaft is enclosed; the tubular member is rotatably supported by a portion of the apparatus housing enclosing the tubular member and is connected to the apparatus housing via the one-way clutch; an annular end surface on the other end of the tubular member is connected to the rotational input shaft via the friction-engagement torque limiter; and the rotational input shaft is an output shaft of the motor or is securely connected to the output shaft in a coaxial state.

The torque limiter in such instances may comprise a friction plate attached to the annular end surface of the tubular member; a sliding rotational plate that rotates integrally with the rotational input shaft and is coaxially attached thereto in a state allowing sliding in an axial direction thereof; and an urging member for pressing the sliding rotational plate against the friction plate.

When a compression coil spring is used as the urging member, the adjusting mechanism may be an adjusting screw for adjusting an amount of compression of the compression coil spring.

According to the present invention, a one-way clutch and a torque limiter are incorporated into a reduction device, thereby allowing the implementation of an automatic torque-switching apparatus having a small-sized, compact structure capable of automatically and reversibly switching from high-speed rotational output to high-torque, low-speed rotational output in accordance with the required torque.

BEST MODE FOR CARRYING OUT THE INVENTION

An example of an automatic torque-switching apparatus to which the present invention is applied will be described below with reference to the drawings.

Figure 1:
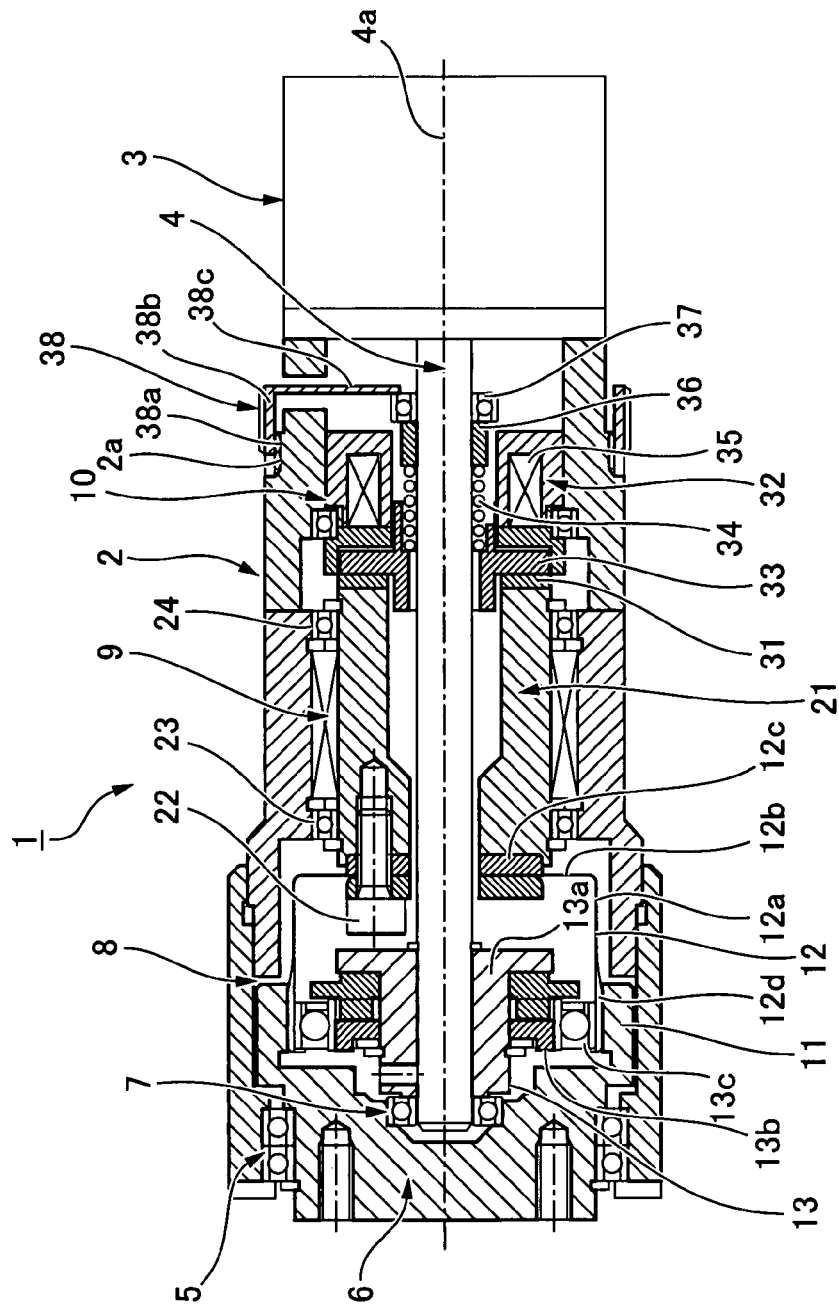
FIG. 1 is a longitudinal cross-sectional view that shows an automatic torque-switching apparatus to which the present invention has been applied.

FIG. 1 is a longitudinal cross-sectional view that shows the automatic torque-switching apparatus of the present example. An automatic torque-switching apparatus 1 of the present example has a tubular apparatus housing 2. A motor 3 is coaxially fixed to the back end of the apparatus housing 2. A motor shaft (rotational input shaft) 4 protrudes from the center of the forward surface of the motor 3. The motor shaft 4 extends coaxially into the apparatus housing 2, and the tip of the motor shaft reaches a position near the forward end of the apparatus housing 2.

An output flange 6 is rotatably supported via a bearing 5 on the forward end of the apparatus housing 2. The tip part of the motor shaft 4 is rotatably supported via a bearing 7 in a concave part formed in the central portion of the inside end surface of the output flange 6. A load-side member (not shown) is connected to the outside end surface of the output flange 6. A wave-gear reduction device 8, a one-way clutch 9, and a torque limiter 10 are coaxially positioned within the apparatus housing 2 in the stated order from the forward end to the back end.

The wave-gear reduction device 8 is a so-called "cup type" and is provided with a rigid internal gear 11, a cup-shaped flexible external gear 12 positioned coaxially inside the rigid internal gear, and a wave generator 13 that has ellipsoid contours and is fit inside the flexible external gear. The rigid internal gear 11 is formed integrally with the output flange 6. The cup-shaped flexible external gear 12 is provided with a tubular trunk part 12a capable of flexing in the radial direction, an annular diaphragm 12b formed on the back end of the trunk part, a boss 12c that is continuous with the inner circumferential edge of the annular diaphragm 12b, and an external tooth 12d formed on the outer circumferential surface of the forward end portion of the tubular trunk part 12a. A center hole through which the motor shaft 4 passes and extends is formed in the boss 12c. The wave generator 13 is provided with a tubular hub 13a coaxially fixed to a location on the distal-end side of the motor shaft 4, a rigid plug 13b that has ellipsoid contours and is coaxially attached to the outer circumferential surface of the hub 13a, and a wave bearing 13c fit between the rigid plug 13b and the inside surfaces of the portions where external teeth on the flexible external gear 12 are formed. The wave bearing 13c is provided with an inner ring and an outer ring capable of flexing in the radial direction.

A tubular member 21 that coaxially encloses the motor shaft 4 is positioned to the rear of the wave-gear reduction device 8. The forward end of the tubular member 21 is coaxially connected and secured to the boss 12c of the flexible external gear 12 via a plurality of fastening bolts 22 and rotates integrally with the flexible external gear 12. The forward and rear ends of the tubular member 21 are supported by a pair of bearings 23, 24 in the apparatus housing 2. The tubular member is connected to the apparatus housing 2 via the one-way clutch 9 that is inserted between the bearings 23, 24. The tubular member 21 is therefore capable of free rotation in only one direction and is incapable of rotation in the opposite direction. In other words, the flexible external gear 12, which is securely connected to the tubular member 21, is also capable of free rotation in only one direction and is incapable of rotation in the opposite direction. A variety of well-known structures may be used for the one-way clutch 9.

The torque limiter 10 is positioned to the rear of the tubular member 21. The torque limiter 10 is provided with a friction plate 31 attached to the back end surface of the tubular member 21, and an electromagnetic solenoid 32 positioned to the rear of the friction plate. The electromagnetic solenoid 32 is provided with a sliding rotating plate 33 composed of a magnetic body positioned to the rear of the friction plate 31, a compression coil spring 34 for pressing the sliding rotating plate 33 against the friction plate 31, and an electromagnet part 35 capable of electromagnetically attracting the sliding rotating plate 33 towards the rear against the force of the spring. The sliding rotating plate 33 is connected to the motor shaft 4 so as to rotate integrally therewith and is capable of sliding in the direction of the central axis 4a of the motor shaft.

The electromagnetic solenoid 32 is usually in a demagnetized state. The sliding rotating plate 33 is pressed against the friction plate 31 by the force of the compression coil spring 34 in this state, and the motor shaft 4 and the tubular member 21 are fixed together by the friction engagement force therebetween and rotate integrally. When a torque that is stronger than the friction engagement force between the motor shaft and the tubular member is applied, the linkage between the motor shaft 4 and the tubular member 21 is released, and only the motor shaft 4 rotates. When the electromagnetic solenoid 32 is magnetized, the sliding rotating plate 33 is attracted toward the rear against the force of the compression coil spring 34 and is separated from the friction plate 31. As a result, the tubular member 21 is completely separated from the motor shaft 4.

The compression coil spring 34 is mounted in a compressed state between the sliding rotating plate 33 and a tubular spring retainer 36 positioned on a portion of the outer circumferential surface of the motor shaft 4 to the rear of the sliding rotating plate. The tubular spring retainer 36 is capable of sliding in the direction of the central axis 4a, and the back end of the tubular spring retainer 36 is supported via a bearing 37 by a spring 38 for adjusting friction force. The spring 38 for adjusting friction force is provided with a tubular part 38b provided with a female screw 38a that is engaged with a male screw 2a formed on the apparatus housing 2; and a support-arm part 38c that extends from the tubular part 38b toward the center. The inner end part of the support-arm part 38c supports the back end of the tubular spring retainer 36 via the bearing 37. When the spring 38 for adjusting friction force is turned, the spring 38 for adjusting friction force moves in the direction of the central axis 4a, and the tubular spring retainer 36 linked to the spring also moves in the same direction. As a result, the amount of compression of the compression coil spring 34 can be adjusted, and the friction engagement force that is generated can be adjusted according to the force of the spring.

Figure 2A:
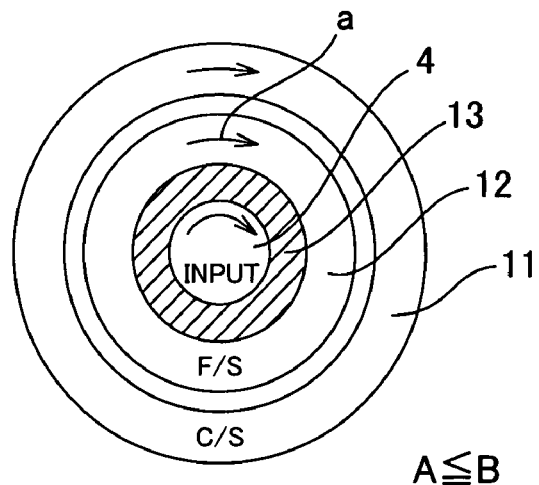
FIGS. 2A and 2B are diagrams for describing the operation of the automatic torque-switching apparatus of FIG. 1.

FIG. 2 is a descriptive diagram that shows the operation of the automatic torque-switching apparatus 1 having this configuration. First, the motor 3 is driven in an unloaded state, and the motor shaft 4 is made to rotate at high speed in the direction permitted by the one-way clutch 9. The wave generator 13 of the wave-gear reduction device 8 is fixed to the distal-end part of the motor shaft 4. The motor shaft 4 is securely connected to the flexible external gear 12 of the wave-gear reduction device 8 via the torque limiter 10 and the tubular member 21. The wave generator 13 that acts as the rotational input member of the wave-gear reduction device 8 and the flexible external gear 12 that acts as the fixed member therefore rotate integrally with the motor shaft 4, as shown in FIG. 2A. The speed reducing operation is therefore not performed, the rotation of the motor shaft 4 is output directly via the rigid internal gear 11 that acts as the rotational output member, and the output flange 6 rotates at the same high speed as the motor shaft 4.

Figure 2B:
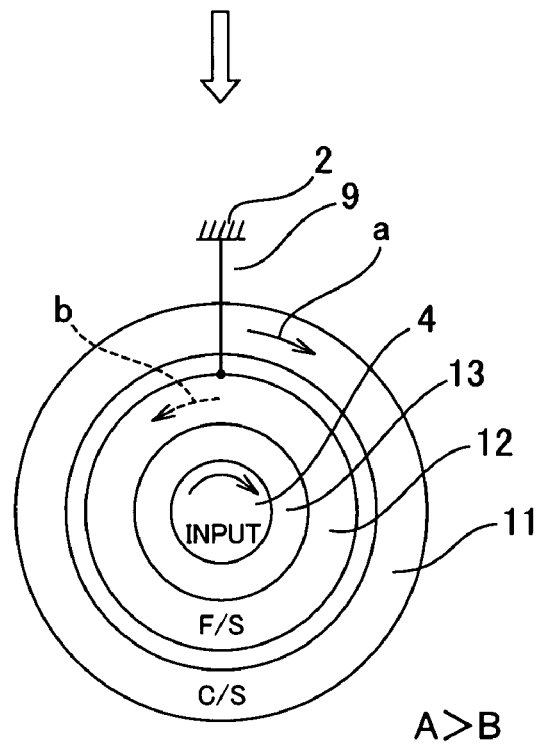

Next, a load torque that acts from the load side begins to increase. Once a torque A (the sum of the input torque due to the load torque and the input torque due to internal friction) that acts on the one-way clutch 9 exceeds a friction torque B due to the friction engagement force thereof, a switch is made to rotational output having reduced speed and a large torque, as shown in FIG. 2B.

The linkage between the motor shaft 4 and the tubular member 21 is released in this state, and only the motor shaft 4 rotates. The tubular member 21, which is securely connected to the flexible externally toothed gear 12, is connected to the apparatus housing 2 on the secured side via the one-way clutch 9. The tubular member 21 is therefore incapable of rotating in a direction b that is the reverse of a rotational direction a of the motor shaft 4, and is therefore held in a fixed state. The flexible external gear 12 securely connected to the tubular member 21 is also held in a fixed state. As a result, the speed reducing operation of the wave-gear reduction device 8 is performed, and rotation having reduced speed and a large torque is output from the rigid internal gear 11 (the output flange 6) that acts as the rotational output member.

The output of the automatic torque-switching apparatus 1 accordingly has a small torque having the same rotation as the motor until the torque acting from the load side reaches a prescribed value. Once the torque exceeds the prescribed value, the output rotational speed of the motor is automatically decreased and a switch is made to the rotational output having reduced speed and a large torque. The torque value at which the switch is made from a low-torque output to a high-torque output can be adjusted by turning the spring 38 for adjusting friction force and adjusting the friction force of the torque limiter 10.

The reduction device may also have a format other than a wave-gear reduction device. For example, a planetary-gear reduction device or other type of reduction device may be used. A coulomb-friction dependent mechanism, an electromagnetic-force dependent mechanism, a friction dependent mechanism employing gears, or a variety of other mechanisms may also be used as the friction engagement mechanism of the torque limiter.

The invention claimed is:

1. An automatic torque-switching apparatus, comprising:
a tubular apparatus housing;
a motor coaxially fixed to a back end of the tubular apparatus housing, a motor shaft of which protrudes from a center of the forward surface of the motor and extends coaxially into the tubular apparatus housing, and a tip of the motor shaft reaches a position near a forward end of the tubular apparatus housing;
an output flange rotatably supported via a first bearing on the forward end of the tubular apparatus housing, wherein the tip part of the motor shaft is rotatably supported via a second bearing in a concave part formed in a central portion of an inside end surface of the output flange;
a wave-gear reduction device, a one-way clutch, and a torque limiter coaxially positioned within the tubular apparatus housing which are arranged in this order from the forward end to the back end of the tubular apparatus housing;
the wave-gear reduction device being provided with a rigid internal gear, a cup-shaped flexible external gear positioned coaxially inside the rigid internal gear, and a wave generator that has an ellipsoid contour and is fit inside the flexible external gear, wherein the rigid internal gear is formed integrally with the output flange and the wave generator is coaxially fixed to the motor shaft;
the cup-shaped flexible external gear being connected to the apparatus housing via the one-way clutch; and
the motor shaft and the cup-shaped flexible external gear being connected via the torque limiter so as to rotate integrally only when a torque acting on the cup-shaped flexible external gear is less than or equal to a prescribed value.

2. The automatic torque-switching apparatus according to claim 1, further comprising an adjusting mechanism for adjusting a friction engagement force between the motor shaft and the cup-shaped flexible external gear via the torque limiter.

3. The automatic torque-switching apparatus according to claim 2, further comprising:
a tubular member having one end securely connected in a coaxial state to the flexible external gear is disposed in a state in which the motor shaft is enclosed;
the tubular member is rotatably supported by a portion of the apparatus housing enclosing the tubular member and is connected to the apparatus housing via the one-way clutch; and
an annular end surface on the other end of the tubular member is connected to the motor shaft via the torque limiter.

4. The automatic torque-switching apparatus according to claim 3, wherein the torque limiter comprises:
a friction plate attached to the annular end surface of the tubular member;
a sliding rotational plate that rotates integrally with the motor shaft and is coaxially attached thereto in a state allowing sliding in an axial direction thereof; and
an urging member for pressing the sliding rotational plate against the friction plate.

5. The automatic torque-switching apparatus according to claim 4, wherein
the urging member is a compression coil spring; and further comprising
an adjusting screw for adjusting an amount of compression of the compression coil spring.

* * * * *